United States Patent [19]

Deucker

[11] Patent Number: 5,047,517

[45] Date of Patent: Sep. 10, 1991

[54] LAKED PYRAZOLONE AZO PIGMENT, PROCESS FOR ITS PREPARATION AND ITS USE

[75] Inventor: Walter Deucker, Bad Soden am Taunus, Fed. Rep. of Germany

[73] Assignee: Hoechst Aktiengesellschaft, Frankfurt am Main, Fed. Rep. of Germany

[21] Appl. No.: 413,853

[22] Filed: Sep. 28, 1989

[30] Foreign Application Priority Data

Sep. 30, 1988 [DE] Fed. Rep. of Germany ....... 3833226

[51] Int. Cl.$^5$ .................. C09B 63/00; D06P 1/44; D06P 3/79
[52] U.S. Cl. .................................. 534/784; 534/573; 534/581; 534/582; 534/588; 534/602; 534/793
[58] Field of Search ............... 534/581, 582, 588, 602, 534/784, 786, 793, 573 L

[56] References Cited

U.S. PATENT DOCUMENTS

| | | | |
|---|---|---|---|
| 2,948,715 | 8/1960 | Siebert et al. | 534/573 |
| 3,545,992 | 12/1970 | Christmann et al. | 534/573 X |
| 4,594,411 | 6/1986 | Henning | 534/784 |
| 4,767,844 | 8/1988 | Ando et al. | 534/573 |

FOREIGN PATENT DOCUMENTS

| | | | |
|---|---|---|---|
| 0126405 | 11/1984 | European Pat. Off. | 534/784 |
| 2616981 | 10/1977 | Fed. Rep. of Germany | 534/784 |
| 3543512 | 6/1987 | Fed. Rep. of Germany | 534/784 |
| 50-67841 | 6/1975 | Japan | 534/784 |
| 797850 | 7/1958 | United Kingdom | 534/573 |

OTHER PUBLICATIONS

Dobrovolny et al., Chemical Abstracts, vol. 76, No. 114834z (1972).
Georg Henning, *Chem. Abs.*, 88:38948v, (1978).
Georg Henning, *Chem. Abs.*, 102:63586r, (1985).

*Primary Examiner*—Mary C. Lee
*Assistant Examiner*—Fiona T. Powers

[57] ABSTRACT

The invention relates to a yellow monoazo pigment which is obtained by diazotization of 2-amino-4-chloro-5-methylbenzene-1-sulfonic acid, coupling of the diazonium compound with 1-(3'-sulfophenyl)-3-methyl-5-pyrazolone and subsequent laking of the coupling product to the calcium salt.

The new pigment has excellent heat stability and bleeding fastness and good light stability. It is particularly suitable for the pigmenting of polymeric plastics in the mass.

4 Claims, No Drawings

LAKED PYRAZOLONE AZO PIGMENT, PROCESS FOR ITS PREPARATION AND ITS USE

DESCRIPTION

The present invention relates to the technical field of laked azopigments.

It is already known to use metal salts of individual azo compounds of the pyrazolone series which contain two sulfo groups in the molecule as pigments (azo lakes):

Thus, for example, German Patent 2,616,981 describes metal salts of pyrazolone azo dyes which are obtained by coupling of diazotized 2-amino-4,5-dichlorobenzene-1-sulfonic acid with 1-(sulfoaryl)-3-methyl-5-pyrazolone compounds and subsequent laking with metal salts.

Furthermore, German Offenlegungsschrift 3,133,404 illustrates laked azo dyes whose diazo component is an aminobenzenesulfonic acid containing an additional substituent in the p-position relative to the amino group and whose coupling component is also a 1-(sulfoaryl)-3-methyl-5-pyrazolone compound.

European Patent 0,126,405 also mentions laked pyrazolone azo pigments which have two lakable groups and whose structure is based on tri- or tetrasubstituted anilines as diazo components and 1-aryl-3-methyl-5-pyrazolone compounds as coupling components, aryl denoting in this case a trisubstituted phenyl radical This publication discloses, inter alia, 2-amino-4-chloro-5-methylbenzene-1-sulfonic acid as diazo component for the preparation of an azo pigment.

The properties with respect to practical application of the azo pigments mentioned in the prior art are in some respects less than desirable Furthermore, the azo pigments disclosed in European Patent 0,126,405 are relatively complicated to prepare due to the high degree of substitution.

The invention relates to the water-insoluble yellow monoazo compound of the formula (I)

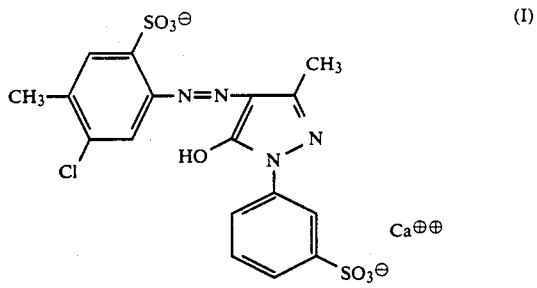

The monoazo compound of the formula (I) is prepared by methods customary per se by coupling of a diazonium salt of the amine of the formula (II)

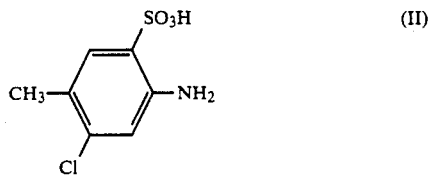

onto the pyrazolone derivative of the formula (III)

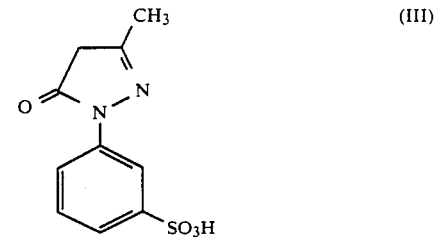

and subsequent laking the previously obtained coupling product by reaction with a water-soluble calcium salt.

The coupling reaction to form the monoazo compound defined by its formula can even be carried out as direct or indirect coupling process. Preferably, the direct coupling is used by, for example, adding a solution or suspension of the diazonium salt dropwise to a heated aqueous mixture of the coupling component dissolved by means of alkali or running it into the mixture, while maintaining the pH in a weakly acidic range, preferably at a pH of 6.0 to 6.5, by the addition of further alkali.

The azo compound thus produced is laked by adding a calcium salt, preferably a water-soluble calcium salt, in the form of its aqueous solution to a suspension of the coupling product and additionally stirring the mixture for some time, during which a slightly elevated temperature of 50° to 100° C. is usually advisable for completing the laking.

To obtain the laked azo pigment in a particularly soft-grained form, it can be advantageous to carry out the laking in the presence of dispersants or surfactants, in particular cation-active surfactants. Suitable cation-active surfactants for this object are fatty amines having 8 to 18 carbon atoms, such as octylamine, nonylamine, decylamine, undecylamine, dodecylamine, tridecylamine, tetradecylamine, pentadecylamine, hexadecylamine, heptadecylamine, octadecylamine, oleylamine, coconut fatty amine and tallow amine, in particular the straight-chain fatty amines listed. Furthermore basesubstituted derivatives of fatty amines, such as, for example, coconut fatty propylenediamine and, in particular, tallow fatty propylenediamine, are usable.

The dispersant or surfactant selected can be added to the coupling suspension, after the coupling reaction is completed, but before the laking, or even during the coupling reaction. It is also possible to add the dispersant or surfactant to the coupling component before the coupling reaction.

The invention also relates to the use of the compound of the formula (I) as colorant for the pigmenting of natural and synthetic materials The compound of the formula (I) is a very good yellow pigment, which is distinguished in particular by excellent heat stability and bleeding fastness and very good light stability. The pigment according to the invention can be used, for example, for the pigmenting of printing inks, lacquers, thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile. It is also useful for pigment printing and for the pigmenting of paper in the mass.

Due to its excellent heat resistance, the pigment is in particular suitable for the pigmenting of plastics in the mass, such as, for example, of polystyrene and its mixed polymers, polyolefins, in particular polyethylene and polypropylene and the corresponding mixed polymers, polyvinyl chloride and polyesters, in particular polyethylene glycol terephthalate and polybutylene terephthalate and the corresponding mixed condensation products based on polyesters.

In the examples which follow, parts and percentages given are by weight, unless stated otherwise. Parts by volume relate to parts by weight as the liter relates to the kilogram.

EXAMPLE 1

221 parts of 2-amino-4-chloro-5-methylbenzene-1-sulfonic acid are dissolved in 2000 parts of drinking water and 123 parts of 33% sodium hydroxide solution with heating, the solution is clarified, and 300 parts by volume of concentrated hydrochloric acid are added. It is cooled to about 15° C. by the addition of ice and diazotized with 140 parts by volume of a 38% sodium nitrite solution 254 parts of 1-(3'-sulfophenyl)-3-methyl-5-pyrazolone are dissolved in 2000 parts of drinking water and 150 parts of 33% sodium hydroxide solution The suspension of the diazonium salt is slowly run into the warm solution of the coupling component at 60° C., during which the pH is maintained in the range from 6.0 to 6.5 by the addition of sodium hydroxide solution After the coupling reaction is completed, the mixture is heated to 80° C., and a warm aqueous solution of 250 parts of calcium chloride at 80° C. is rapidly run into the mixture. The pigment suspension is additionally stirred at 80° C. for 2 hours, then filtered, and the product is washed and dried at 120° C.

EXAMPLE 2

The procedure of Example 1 is repeated, except that 2.5 parts of tallow fatty propylenediamine dissolved in 80 parts of water are additionally added to the solution of the coupling component before the coupling reaction

EXAMPLE 3

Coloration of plasticized PVC 0.1 part of the pigment obtained according to Example 1 are mixed with 100 parts of the composition consisting of 67 parts of polyvinyl chloride (®Hostalit S 4170, Hoechst AG), 31 parts of bis(2-ethylhexyl) phthalate, 2 parts of dibutyltin thioglycolate and 0.5 part of titanium dioxide (PV-Echtweiss R01, Hoechst AG), which has been prepared by mixing the components in a rapid mixer at about 90° C. and subsequent cooling in a cooling mixer, and are processed in a heatable roll mill at 130° C. to give a rolled sheet The resulting rolled sheet press-molded in a high-pressure steam press shows a clear intensive yellow coloration which has very good light and bleeding fastness.

EXAMPLE 4

The procedure of Example 3 is repeated, except that the 0.1 part of the pigment from Example 1 is replaced by 0.1 part of the pigment from Example 2. This gives an intensive yellow coloration in plasticized PVC which has comparable fastness properties as in Example 3.

EXAMPLE 5

Coloration of polyethylene 0.9 part of the pigment obtained according to Example 1 are thoroughly mixed with 300 parts of polyethylene powder (®Hostalen GC 7260, Hoechst AG) and 3 parts of titanium dioxide (Titandioxid Rutil ®Kronos CL 220, Kronos Titan GmbH) in a drum mixer. The pigments are dispersed by extruding the mixture twice in an extruder at 200° C. and granulating the moldings obtained. Some of the granules are processed on an injection-molding machine at 200° C. to give moldings in the form of platelets which have a clear yellow coloration of excellent heat stability.

EXAMPLE 6

The procedure of Example 5 is repeated, replacing the 0.9 part of the pigment according to Example 1 by 0.9 part of the pigment according to Example 2 This gives a coloration comparable to that of Example 5 which has very good heat stability.

I claim:

1. A water-insoluble monoazo compound of the formula (I)

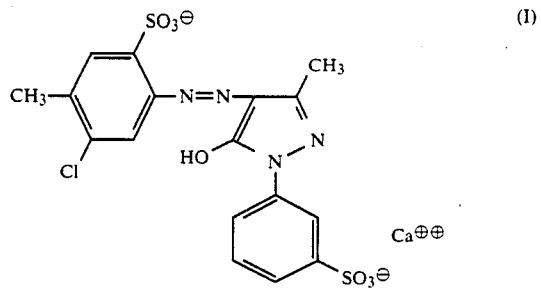

2. A colorant for the pigmenting of natural and synthetic materials comprising the monoazo compound of claim 1.

3. A colorant for the pigmenting of printing inks, lacquers, thermoplastic, thermosetting materials, natural resins, synthetic resins, polystyrene and its mixed polymers, polyolefins, polyacrylic compounds, polyvinyl compounds, polyesters and rubber, filaments made of viscose and cellulose ethers, cellulose esters, polyamides, polyurethanes, polyesters, and polyacrylonitrile comprising the monoazo compound of claim 1.

4. A colorant for the pigmenting of polystyrene, polyvinyl chloride, polyethylene, polypropylene, polyvinyl acetate, or polyglycol terephthalates, comprising the monoazo compound of claim 1.

* * * * *